United States Patent
Wright et al.

(10) Patent No.: US 11,617,995 B2
(45) Date of Patent: Apr. 4, 2023

(54) AGITATOR ROD FOR AGRICULTURAL AGITATOR

(71) Applicant: CNH Industrial Canada, Ltd., Saskatoon (CA)

(72) Inventors: Jared Steven Wright, Saskatoon (CA); Jesse Blair Pidwerbesky, Warman (CA); Paul David Minto, Saskatoon (CA); Nicholas George Alfred Ryder, Saskatoon (CA); Hans Luther Deason, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 371 days.

(21) Appl. No.: 16/745,996

(22) Filed: Jan. 17, 2020

(65) Prior Publication Data
US 2021/0220783 A1     Jul. 22, 2021

(51) Int. Cl.
| | |
|---|---|
| *B01F 27/00* | (2022.01) |
| *B01F 27/072* | (2022.01) |
| *A01C 7/10* | (2006.01) |
| *A01C 15/00* | (2006.01) |

(52) U.S. Cl.
CPC .......... *B01F 27/0726* (2022.01); *A01C 7/102* (2013.01); *A01C 15/007* (2013.01)

(58) Field of Classification Search
CPC .................................................. B01F 7/00158
See application file for complete search history.

(56) References Cited

U.S. PATENT DOCUMENTS

| | | | |
|---|---|---|---|
| 544,966 A | * | 8/1895 | Davis ..................... A01C 15/16 222/274 |
| 3,432,150 A | | 3/1969 | Dreyer |
| 4,479,721 A | | 10/1984 | Rieger |
| 4,552,461 A | | 11/1985 | Ott et al. |
| 4,722,608 A | | 2/1988 | Salzman et al. |
| 5,035,190 A | * | 7/1991 | Grimes .................... A01C 7/08 111/195 |
| 6,739,272 B2 | | 5/2004 | Crabb et al. |
| 6,935,256 B1 | | 8/2005 | Meyer |
| 8,485,716 B2 | | 7/2013 | Handa |
| 9,686,904 B2 | | 6/2017 | Roszman et al. |
| 2002/0100401 A1 | * | 8/2002 | Lempriere ............. A01C 7/125 111/178 |
| 2014/0061249 A1 | | 3/2014 | Hilvers et al. |

FOREIGN PATENT DOCUMENTS

| | | |
|---|---|---|
| EP | 0507764 A2 | 10/1992 |
| EP | 0813806 A1 | 12/1997 |
| EP | 0865817 A1 | 9/1998 |
| EP | 1559305 A1 | 8/2005 |
| GB | 2026447 A | 2/1980 |

\* cited by examiner

*Primary Examiner* — Anshu Bhatia
(74) *Attorney, Agent, or Firm* — Rebecca Henkel; Rickard DeMille

(57) ABSTRACT

An agitator for an agricultural system includes a shaft configured to rotate about a rotational axis during operation of the agricultural system, and an extension coupled to the shaft. The extension includes a hoop and a tine extending from the hoop, and the tine extends acutely relative to the rotational axis of the shaft.

17 Claims, 7 Drawing Sheets

AGITATOR ROD FOR AGRICULTURAL AGITATOR

BACKGROUND

The disclosure relates generally to an agitator rod for an agricultural agitator.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are used to distribute particulate material, such as seeds, fertilizer, and/or other agricultural product, on or in an agricultural field using various methods. The agricultural seeding implement may be towed behind a work vehicle, such as a tractor. Certain embodiments of agricultural seeding implements include a storage tank in which the particulate material is stored and a metering system configured to meter the particulate material from the storage tank. The particulate material is distributed from the metering system to row units, which are configured to distribute the particulate material on or in the ground of the agricultural field.

As the storage tank is filled with the particulate material and/or while the particulate material flows from the storage tank to the metering system, the particulate material may form an undesirable profile within the storage tank. Several factors may contribute to this undesirable profile, including, but not limited to, friction between the particulate material and the storage tank, clumping of the particulate material, operation of the implement on a slope, and an inactive portion or inactive portions of the metering system. This undesirable profile may lead to uneven flow to the metering system, thereby causing an unwanted distribution or no distribution of the particulate material over and/or within certain regions of the agricultural field. As a result, the crop yield within these regions may be reduced, thereby reducing the efficiency of the seeding process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an agitator for an agricultural system includes a shaft configured to rotate about a rotational axis during operation of the agricultural system, and an extension coupled to the shaft. The extension includes a hoop and a tine extending from the hoop, and the tine extends acutely relative to the rotational axis of the shaft.

DRAWINGS

These and other features, aspects, and advantages of the present disclosure will become better understood when the following detailed description is read with reference to the accompanying drawings in which like characters represent like parts throughout the drawings, wherein.

Figure 3:
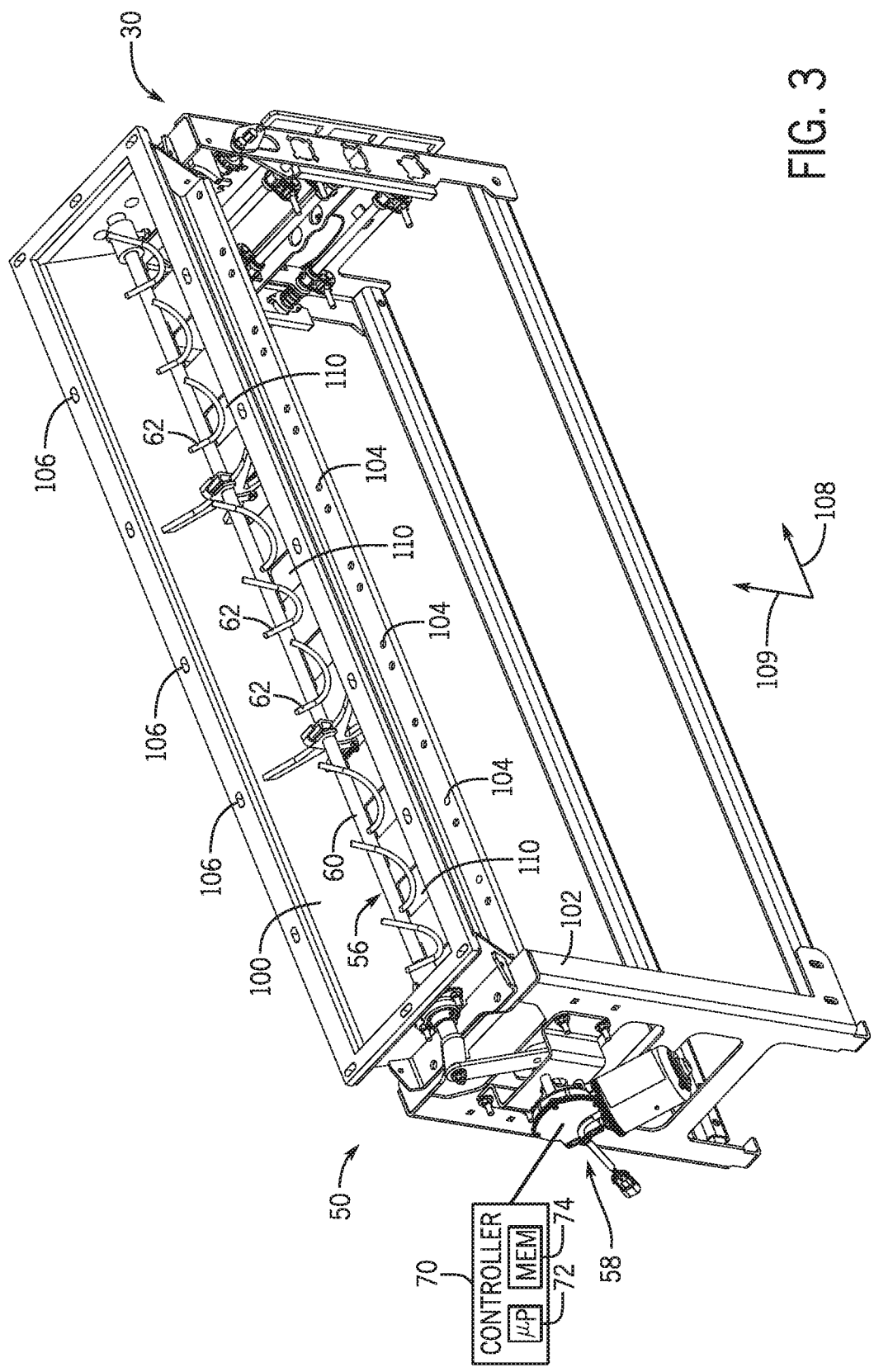
FIG. 3 is a perspective view of an embodiment of a particulate material metering system that may be employed within the air cart of FIG. 1, in which the particulate material metering system has an agitating system, in accordance with an aspect of the present disclosure.
Figure 6:
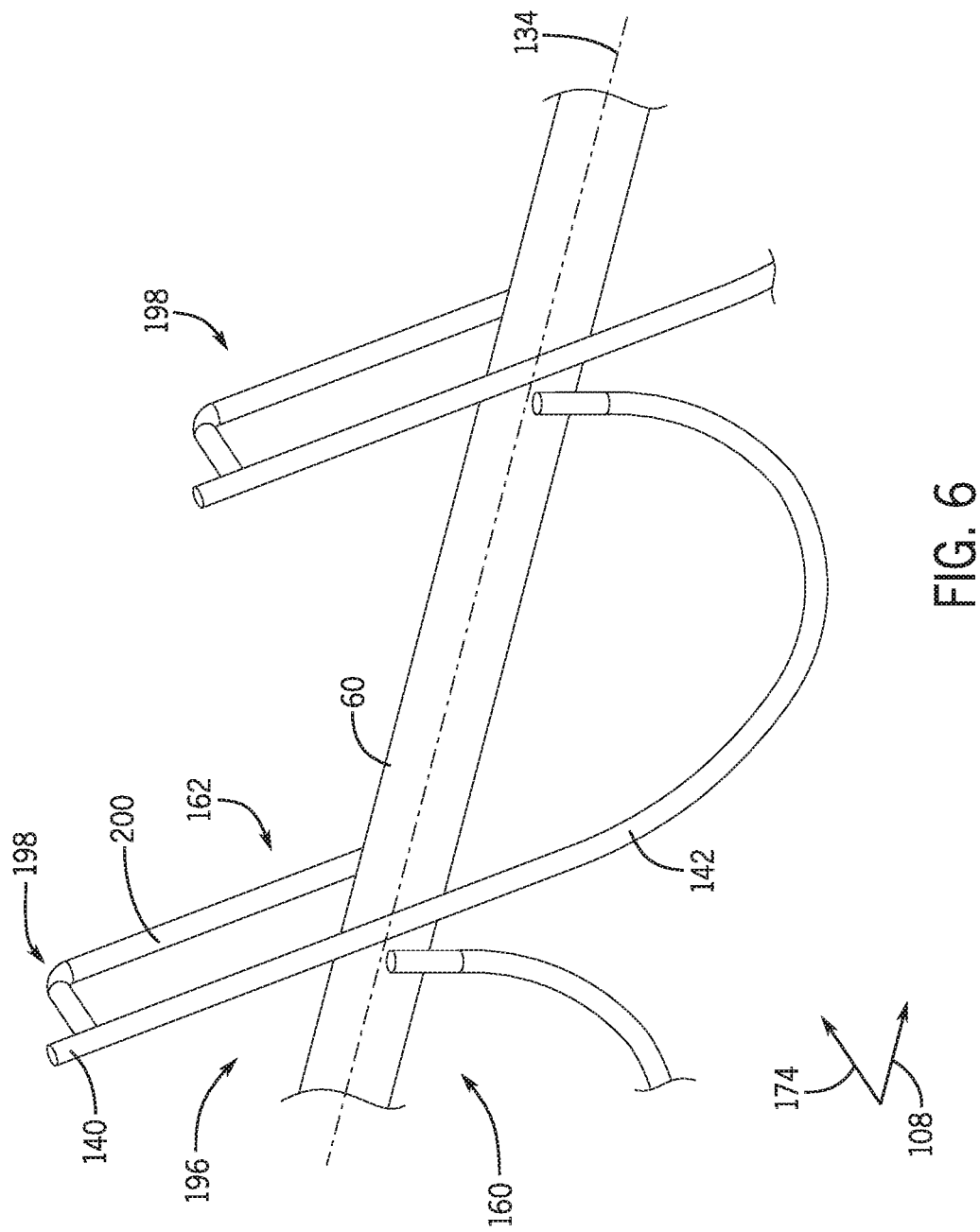
Figure 7:
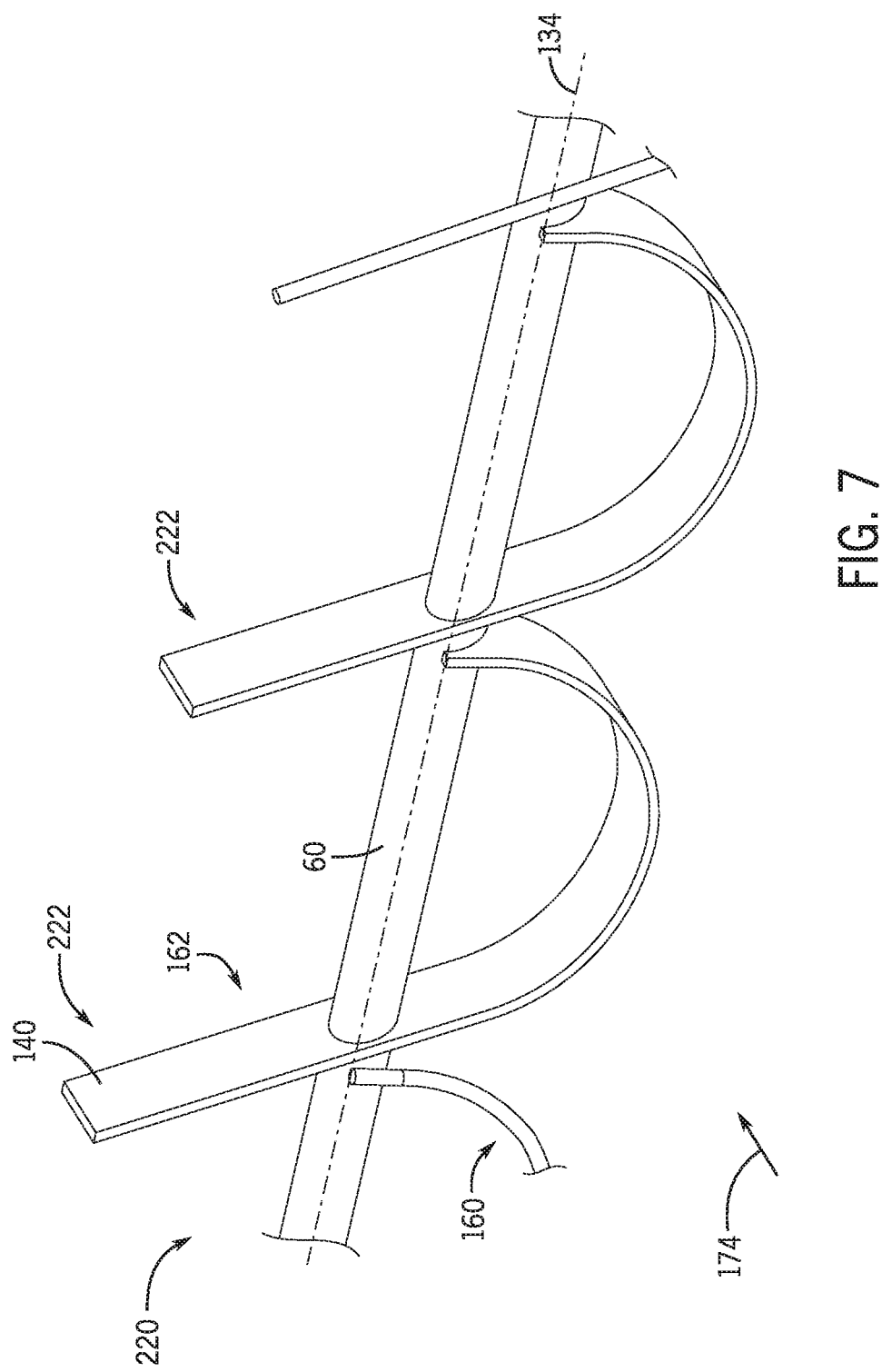

FIG. 6 is an expanded perspective view of a portion of an embodiment of an agitator that may be employed within the agitating system of FIG. 3, in which the agitator has a shaft and multiple extensions, in accordance with an aspect of the present disclosure; and FIG. 7 is an expanded perspective view of an embodiment of an agitator that may be employed within the agitating system of FIG. 3, in which the agitator has a shaft and multiple extensions, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to agricultural systems having an agitator. Certain agricultural systems (e.g., air carts, implements, etc.) contain a particulate material (e.g., seeds, fertilizer, and/or other agricultural products) within a storage tank of the agricultural system. The agricultural system is configured to distribute the particulate material throughout a field. The particulate material may flow from the storage tank through a metering system, which is configured to control the flow of the particulate material to the field. In certain circumstances, the particulate material may clump within the storage tank and form a profile of the particulate material within the storage tank that may affect a manner in which the particulate material moves through the metering system. For example, the profile of the particulate material may cause a reduced amount of particulate material to flow through certain meters of the metering system.

As such, the agricultural system may include an agitating system configured to agitate the particulate material to break up clumping and/or adjust (e.g., level) the profile of the particulate material. However, certain agitating systems may agitate the particulate material at only a few locations along the storage tank/metering system. Accordingly, the agitating system may cause local movement of the particulate material, rather than movement of the particulate material throughout the width of the storage tank. For example, the metering system may include inlets through which the particulate material flows to move into the metering system. However, the agitating system may not cause sufficient agitation between the inlets. As a result, the particular material may form bridges between the inlets to interfere with the flow of the particulate material through the inlets.

Thus, the agitating system disclosed herein is configured to induce movement of the particulate material throughout the width of the storage tank/metering system, thereby enhancing flow of the particulate material into the metering system. As such, embodiments of the present disclosure are directed to an agitating system having extensions coupled to a shaft. Each extension may include a tine and a hoop, and the shaft may be configured to rotate about a rotational axis, thereby rotating the tine and the hoop about the rotational axis. The tine may extend away from the shaft and at least partially along the rotational axis of the shaft, such that the tine spans a greater portion of the width of the particulate material (e.g., as compared to a tine extending substantially perpendicularly away from the rotational axis of the shaft). As such, movement of the tine causes greater agitation of the particulate material (e.g., as compared to the tine extending substantially perpendicularly away from the rotational axis of the shaft). Furthermore, the hoop may agitate the particulate material adjacent to a respective inlet of the metering system. The hoop may also form the particulate material into a particular shape that facilitates flow of the particulate material into the inlet. In this manner, the combination of the tine and the hoop promotes greater movement of the particulate material into the metering system.

Figure 1:
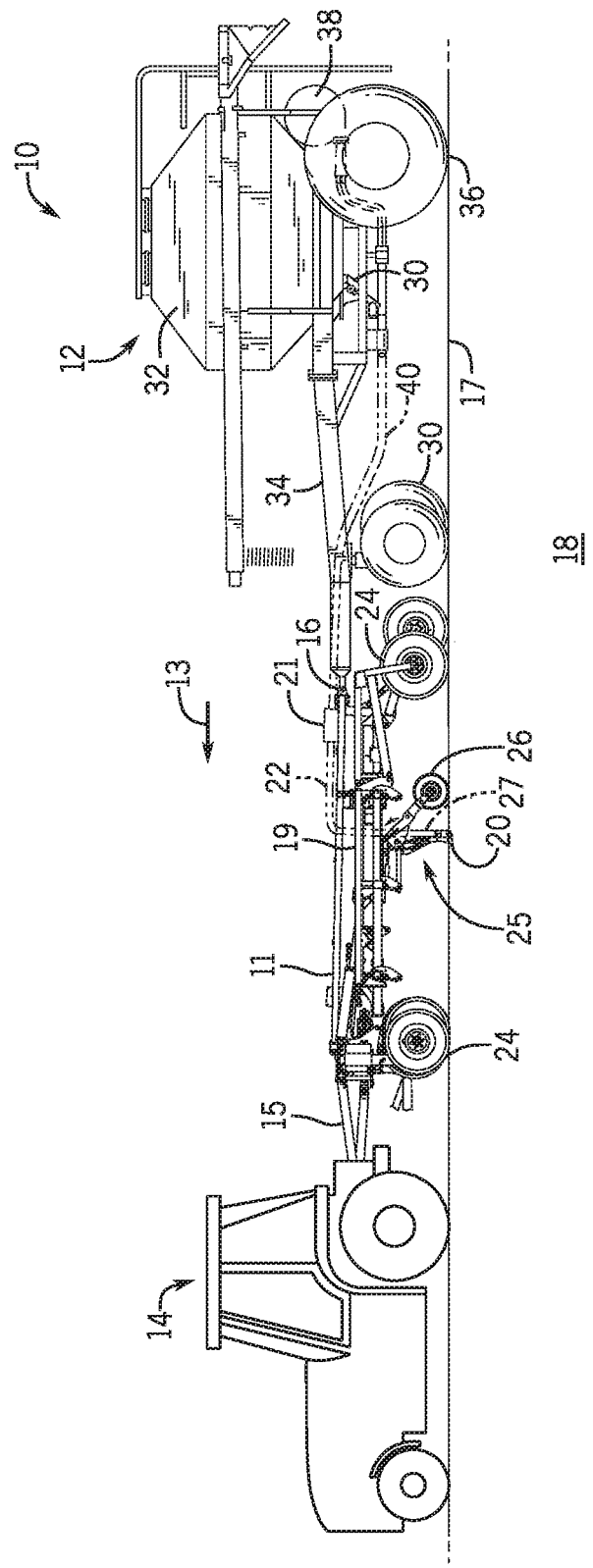
FIG. 1 is a side view of an embodiment of an agricultural system that includes an agricultural implement coupled to an air cart, in accordance with an aspect of the present disclosure.

Turning now to the drawings, FIG. 1 is a side view of an embodiment of an agricultural system 10 that includes an agricultural implement 11 coupled to an air cart 12. In the depicted embodiment, the air cart 12 is towed behind the agricultural implement 11 relative to a direction of travel 13. In addition, the agricultural implement 11 is coupled to a work vehicle 14 (e.g., a tractor) by a first hitch system 15, and the air cart 12 is coupled to the agricultural implement 11 by a second hitch system 16. While the agricultural implement 11 is towed between the work vehicle 14 and the air cart 12 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled (e.g., autonomous) vehicle.

The agricultural implement 11 may be an agricultural seeding implement configured to deposit rows of particulate material (e.g., seeds) into soil of an agricultural field 18 as the agricultural implement 11 is towed across a surface 17 of the agricultural field 18 by the work vehicle 14. The agricultural implement 11 includes a tool frame 19, a row unit 20 (e.g., a ground engaging opener system) coupled to the tool frame 19, a distribution header 21, a hose 22, and wheel assemblies 24. The wheel assemblies 24 contact the surface 17 to enable the agricultural implement 11 to be towed by the work vehicle 14. As the agricultural implement 11 moves in the direction of travel 13, a row of particulate material may be deposited into the soil by the row unit 20. Although one row unit 20 is shown in the illustrated embodiment, the agricultural implement 11 may include multiple row units organized in a row across a width of the agricultural implement. In some embodiments, the agricultural implement 11 may include a row of 12, 14, 16, 18, 20, or more row units 20, which may each deposit a respective row of particulate material. Additionally or alternatively, the agricultural implement 11 may include multiple rows of row units.

To facilitate depositing particular material, each row unit 20 includes an opener 25, a press wheel 26, a tube 27, and a hydraulic cylinder. When the opener 25 engages the soil, the opener 25 exerts a force that excavates a trench into the soil as the row unit 20 travels through the agricultural field 18. In the present embodiment, a vertical position of the press wheel 26 controls the depth of the opener 25, and the hydraulic cylinder controls the downward force (e.g., a down pressure) applied by the press wheel 26. In addition, the opener 25 may be controlled to establish a target depth of the trench. The particulate material may then be deposited into the excavated trench via the tube 27. Then, the press wheel 26 may facilitate movement of the excavated soil into the trench to cover the particulate material and compress the soil covering the particulate material. In certain embodiments, the press wheel may not be a part of the row unit. Instead, for example, the press wheel may be mounted to the frame of the implement behind the row unit. Furthermore, while the illustrated row unit includes a ground engaging opener assembly, in alternative embodiments, at least one row unit on the implement may include an applicator assembly configured to deposit particulate material onto the surface of the agricultural field, or any other suitable type of product deposition assembly.

The air cart 12 centrally stores particulate material and distributes the particulate material to the row unit 20. Accordingly, the air cart 12 includes a particulate material metering system 30, a storage tank 32, an air cart frame 34, wheels 36, and an air source 38. In the depicted embodiment, the air cart frame 34 is coupled to the tool frame 19 via the second hitch system 16. The wheels 36 contact the surface 17 to enable the air cart 12 to be towed along with the agricultural implement 11. Additionally, the storage tank 32 centrally stores the particulate material for distribution. In some embodiments, the storage tank 32 may include multiple compartments for storing different types of particulate material. For example, a first compartment may store seeds while a second compartment may store a dry fertilizer. In such configurations, the air cart 12 may deliver both seeds and fertilizer to the agricultural implement 11 via separate distribution systems, or as a mixture through a single distribution system.

The particulate material metering system 30 may control the amount of particulate material distributed to the agricultural field 18. For example, the particulate material metering system 30 may be controlled to increase or decrease the amount of particulate material distributed to the agricultural field 18. As depicted, the particulate material metering system 30 is mounted to the bottom of the storage tank 32, which enables the storage tank 32 to supply particulate material to the particulate material metering system 30. The particulate material metering system 30 may then distribute the particulate material to the row unit 20 via a line 40 extending to the distribution header 21. The distribution header 21 may then distribute the particulate material to one or more row units 20 via the line(s) 40. Some embodiments may include multiple distribution headers 21, with one or more row units 20 coupled to each distribution header 21 by line(s) 40 (e.g., a line 40 extends to each distribution header 21). In this manner, the particulate material metering system 30 may control distribution of particulate material from the storage tank 32 to the row units 20 and into the trenches.

Figure 2:
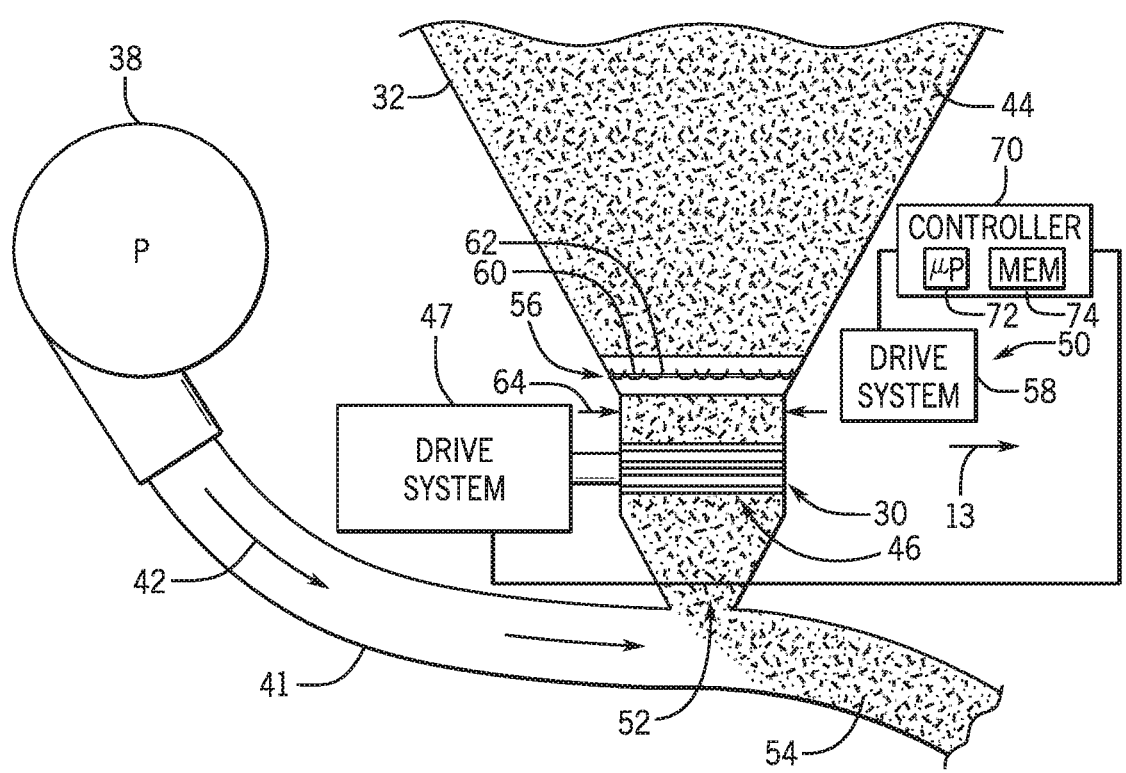
FIG. 2 is a schematic view of an embodiment of a particulate material metering system that may be employed within the air cart of FIG. 1, in accordance with an aspect of the present disclosure.

FIG. 2 is a schematic view of an embodiment of a particulate material metering system 30 that may be employed within the air cart of FIG. 1. As illustrated, the air source 38 is coupled to a conduit 41 configured to provide an air stream 42 past the particulate material metering system 30. The air source 38 may be a pump or blower powered by an electric or hydraulic motor, for example. Particulate material 44 (e.g., seeds, fertilizer, etc.) within the storage tank 32 flows under the influence of gravity through an agitating system 50 into the particulate material metering system 30. In certain embodiments, the storage tank 32 is pressurized such that a static pressure in the storage tank 32 is greater than a static pressure in the conduit 41, thereby facilitating an even flow of particulate material 44 through the particulate material metering system 30. The particulate material metering system 30 includes one or more meter rollers 46 (e.g., rotatable metering devices) configured to regulate the flow of particulate material 44 into the air stream 42. For example, a certain particulate material metering system 30 may include twelve meter rollers 46, and each meter roller 46 may be disposed within an independent housing having a respective inlet leading to a metering unit the includes the meter roller 46. Each metering unit may have a passage that directs particulate material from the inlet to the meter roller 46, and the meter roller is configured to control flow of the particulate material into a respective conduit 41 for distribution to one or more respective row units of the agricultural implement. Such metering systems are known as "12-run" metering systems. However, in alternative embodiments, the particulate material metering system may include more or fewer meter rollers, such as 1, 2, 3, 4, 5, 6, 7, 8, 9, 10, 11, 13, or more. In further embodiments, the meter rollers may be arranged in a different manner as illustrated in FIG. 2. For instance, multiple meter rollers may be disposed within the same housing.

In the illustrated embodiment, the meter roller 46 is coupled to a metering drive system 47 configured to drive the meter roller 46 to rotate. In certain embodiments, the metering drive system 47 includes a drive unit, such as an electric or hydraulic motor, configured to drive one or more meter rollers to rotate. In additional or alternative embodiments, each meter roller may be driven by a respective metering drive system. In further embodiments, the metering drive system 47 may be coupled to a ground-engaging wheel of the air cart (e.g., via a gear system), such that rotation of the ground-engaging wheel drives each meter roller 46 to rotate. Such a configuration automatically varies the rotation rate of the meter roller 46 based on the speed of the air cart.

In the illustrated embodiment, the meter roller 46 is oriented substantially parallel to the direction of travel 13 of the air cart. As used herein, substantially parallel may refer to an angle of about 0 to 45 degrees, about 0 to 30 degrees, about 0 to 15 degrees, about 0 to 5 degrees, or about 0 to 1 degree relative to an axis/direction (e.g., the direction of travel 13). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel or at any other suitable angle.

For a particular meter roller configuration, the rotation rate of the meter roller 46 controls the flow of particulate material 44 into the air stream 42. For example, as the meter roller 46 rotates, the meter roller 46 transfers particulate material 44 through an opening 52 in the particulate material metering system 30 into the conduit 41 (e.g., into a conduit associated with a respective row unit or group of row units). The particulate material 44 then mixes with air from the air source 38, thereby forming a fluidized mixture 54. The fluidized mixture 54 then flows to the respective row unit(s) of the implement via pneumatic conduits, where the particulate material is deposited within the soil.

Before entering the particulate material metering system 30, the particulate material 44 flows through an agitator 56 of the agitating system 50, which is driven by an agitator drive system 58. While the particulate material 44 rests in the storage tank 32 and/or during operation of the particulate material metering system 30, the particulate material 44 may clump together to form pieces larger than the inlets of the housings to the meter roller(s) 46. As the particulate material 44 flows through the agitator 56, the agitator 56 breaks up the clumps of particulate material 44 into smaller pieces that are more suitable for flowing through the inlets to the meter roller(s) 46. The agitator 56 includes a shaft 60 coupled to the agitator drive system 58 and multiple extensions 62 coupled to the shaft 60. During operation of the agitating system 50, the agitator drive system 58 drives the shaft 60 to rotate, thereby driving the extensions 62 to break up clumps of the particulate material 44 and enabling the particulate material to flow through the inlets and/or placing the particulate material 44 in condition to engage the meter roller(s) 46. Although the present disclosure primarily discusses rotation of the agitator 56 to agitate the particulate material 44, in additional or alternative embodiments, the agitator may move in another suitable manner to facilitate flow of the particulate material to the meter roller(s).

In further embodiments, the agitating system may be used for leveling purposes. As an example, a profile of the particulate material may become uneven (e.g., there may be more particulate material over certain meter rollers) in the storage tank. For instance, the air cart may travel over uneven terrain, causing the particulate material to shift due to external forces, leading to uneven distribution of the particulate material in the storage tank. For this reason, in some embodiments, the agitator may be used to move the particulate material to achieve a more even distribution of the particulate material across the width of the storage tank, such as by translating the particulate material along a length 64 of the agitator.

In some embodiments, the agitating system 50 also includes a controller 70 that may be located on the air cart 12. As illustrated, the controller 70 is communicatively coupled to the metering drive system 47 and the agitator drive system 58. The controller 70 is configured to control the agitator drive system 58, such as by altering the operational duration, the speed, and/or the direction of rotation, to cause the agitator 56 to facilitate flow of the particulate material 44 to the particulate material metering system 30. In addition, the controller 70 may control the metering drive system 47 to control the rotation rate of the meter roller(s) 46, thereby controlling a rate at which the particulate material 44 is metered by the particulate material metering system 30.

In the illustrated embodiment, the controller 70 includes a processor 72, such as a microprocessor, and a memory device 74. The controller 70 may also include one or more storage devices and/or other suitable components. The processor 72 may be used to execute software, such as software for controlling the agitator drive system 58. Moreover, the processor 72 may include multiple microprocessors, one or more "general-purpose" microprocessors, one or more special-purpose microprocessors, and/or one or more application specific integrated circuits (ASICS), or some combination thereof. For example, the processor 72 may include one or more reduced instruction set (RISC) or complex instruction set (CISC) processors.

The memory device 74 may include a volatile memory, such as random access memory (RAM), and/or a nonvolatile memory, such as read-only memory (ROM). The memory device 74 may store a variety of information and may be used for various purposes. For example, the memory device 74 may store processor-executable instructions (e.g., firmware or software) for the processor 72 to execute, such as instructions for controlling the agitator drive system 58. The storage device(s) (e.g., nonvolatile storage) may include ROM, flash memory, a hard drive, or any other suitable optical, magnetic, or solid-state storage medium, or a combination thereof. The storage device(s) may store data (e.g., a parameter associated with operation of the agitator drive system 58), instructions (e.g., software or firmware for controlling the agitator drive system 58), and any other suitable data. The processor 72 and/or memory device 74, or an additional processor and/or memory device, may be located in any suitable portion of the system. For example, a memory device storing instructions (e.g., software or firmware for controlling the agitator drive system 58) may be located in or associated with the agitator drive system 58.

FIG. 3 is a perspective view of an embodiment of a particulate material metering system 30 coupled to an agitating system 50, in which the particulate material metering system 30 and the agitating system 50 may be employed within the air cart of FIG. 1. For visualization purposes, metering units that include the meter rollers are not illustrated in FIG. 3. In the illustrated embodiment, the agitator 56 of the agitating system 50 is disposed within a sub-hopper 100, which may be secured to a frame. As an example, the sub-hopper 100 may be coupled to a frame 102 of the particulate material metering system 30. In some embodiments, the sub-hopper 100 includes first holes 104 configured to receive fasteners for securing the sub-hopper 100 to the frame 102, and the sub-hopper 100 includes second holes 106 configured to receive fasteners for securing the sub-hopper 100 to the storage tank or another suitable portion of the agricultural system (e.g., a secondary storage tank, the frame of the air cart). In additional or alternative embodiments, the sub-hopper may be coupled to the frame and/or the storage tank by other suitable component(s), such as weld(s) and/or tab(s).

The agitator 56 is disposed within the sub-hopper 100 and extends along a longitudinal axis 108 across the sub-hopper 100. In certain embodiments, the agitator of the agitating system may be mounted higher in the storage tank relative to the sub-hopper. For example, the agitator may be disposed above the sub-hopper, such as within the structure of the storage tank. During operation of the agricultural implement, particulate material may generally flow downwardly (e.g., along a vertical axis 109) from the storage tank through the sub-hopper 100 and into inlets 110 of the metering units to direct the particulate material to the meter rollers. Additionally, the agitator 56 may rotate to break up the particulate material into smaller pieces, thereby enabling the particulate material to flow into the inlets 110. For example, the controller 70 may output a control signal that causes the agitator drive system 58 to rotate the shaft 60. Rotation of the shaft 60 may drive the extensions 62 to break up clumps within the particulate material, thereby facilitating flow of the particulate material into the inlets 110. As described further below, the geometry of the extensions 62 facilitates breaking up clumps above the inlets 110 and/or directing the particulate material toward the inlets 110, thereby increasing the flow of the particulate material from the storage tank to the metering system.

In the illustrated embodiment, the agitating system 50 includes a single agitator 56 and a single agitator drive system 58 coupled to a side of the frame 102. In certain embodiments, multiple agitators (e.g., 2, 3, 4, 5, 6, 7, 8, etc.) may be disposed in the sub-hopper and/or the storage tank. The agitators may be disposed in series and/or in parallel. For example, multiple agitators may also be disposed along the vertical axis 109 within the sub-hopper and/or storage tank. By way of example, one or more agitator(s) may be disposed in the sub-hopper and one or more agitator(s) may be disposed higher in the storage tank. In a configuration with more than one agitator, the agitator drive system may drive a portion of the agitators or all of the agitators. Additional or alternative embodiments of the agitating system may include multiple agitator drive systems that may each drive one or more agitators. For instance, agitator drive systems may be disposed at opposite ends of the frame along the longitudinal axis 108.

Figure 4:
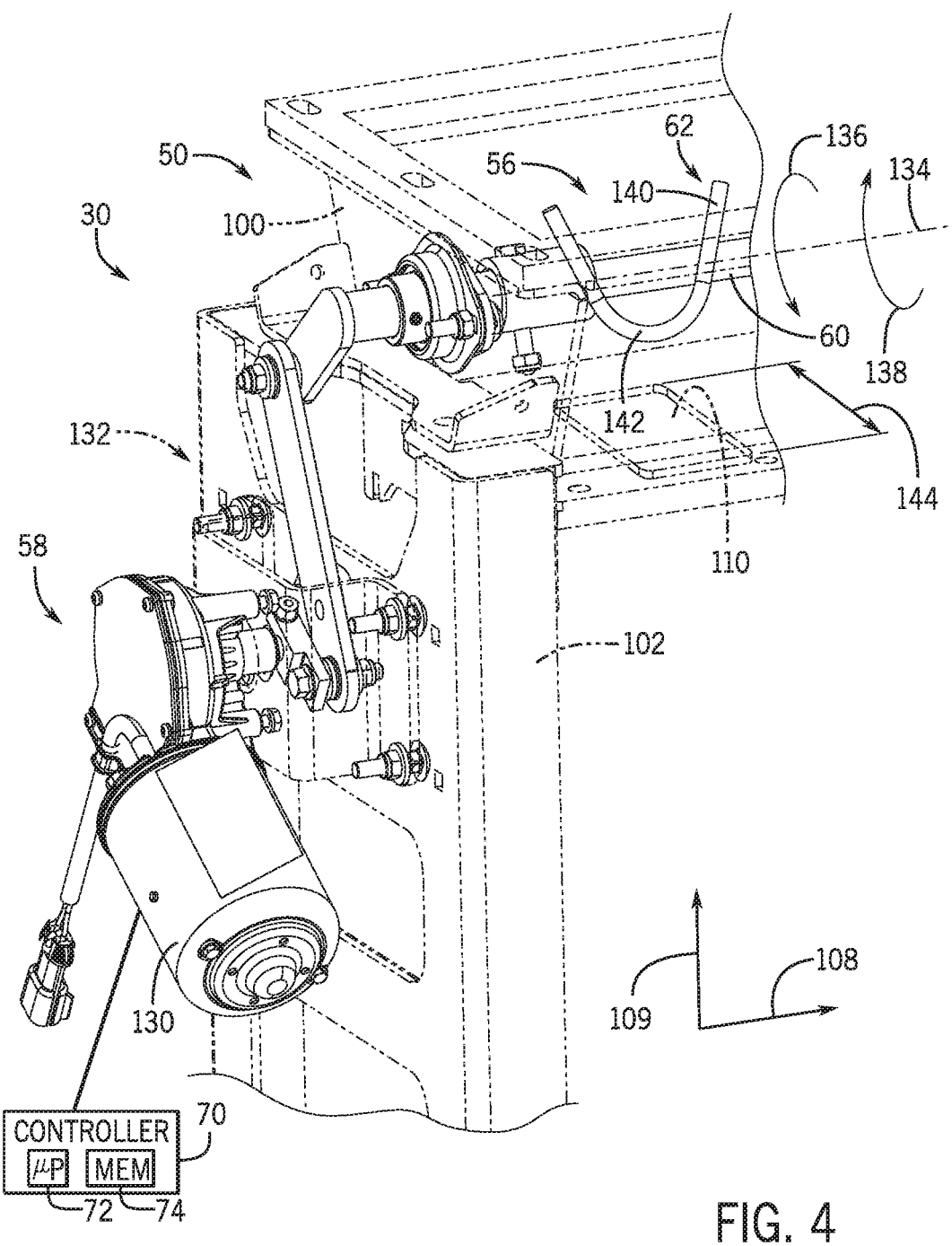
FIG. 4 is an expanded perspective view of a portion of the particulate material metering system of FIG. 3, in accordance with an aspect of the present disclosure.

FIG. 4 is an expanded perspective view of a portion of the particulate material metering system 30 and agitating system 50 of FIG. 3, illustrating agitating system 50 in greater detail. In the illustrated embodiment, the agitator drive system 58 includes a motor 130 that may be communicatively coupled to the controller 70. Further, the motor 130 is coupled to a linkage system 132. The linkage system 132 is configured to couple to the shaft 60 of the agitator 56. During operation of the agricultural implement, the controller 70 may output a control signal to instruct the motor 130 to activate, thereby driving the linkage system 132 to rotate the shaft 60 about a rotational axis 134. In some embodiments, the linkage system 132 may convert a rotational input from the motor 130 into oscillatory rotational movement of the shaft 60, rather than full rotational movement of the shaft 60. Therefore, the agitator 56 may be driven to oscillate about the rotational axis 134, thereby limiting a torque applied by the motor 130. That is, activation of the motor 130 may cause the shaft 60 to rotate in a first rotational direction 136 for a first time interval, a second rotational direction 138 for a second interval, and then the first rotational direction 136 again. In other words, the shaft 60 may alternate rotation between the first rotational direction 136 and the second rotational direction 138.

In certain embodiments, the shaft 60 may rotate in the first rotational direction 136 at a rate and/or through an angle that is substantially similar to the rate and/or angle of rotation in the second rotational direction 138. By way of example, the linkage system 132 may cause the shaft 60 to rotate between 5 degrees and 35 degrees (e.g., 23 degrees) in the first rotational direction 136 and between 5 degrees and 35 degrees (e.g., 23 degrees) in the second rotational direction 138 (e.g., the rotational angle in the first direction may be equal to the rotational angle in the second direction). Also, the shaft 60 may rotate at a frequency between 10 and 50 oscillations or cycles per minute (e.g., split equally in time between the first rotational direction 136 and the second rotational direction 138). Additionally or alternative, the shaft 60 may rotate in the first rotational direction 136 at a rate and/or through an angle that is substantially different than that in the second rotational direction 138. In further embodiments, the shaft 60 may rotate in a single direction about the rotational axis 134 (e.g., the rotational direction of the shaft may be constant). In such embodiments, the linkage system may have a different configuration or may be omitted (e.g., the motor is directly coupled to the shaft).

In the illustrated embodiment, the extension 62 is positioned along the shaft 60 to be substantially aligned with one of the inlets 110. Furthermore, the extension 62 includes a tine 140 that is connected to (e.g., integrally formed with) a hoop 142. The extension 62 may be oriented about the rotational axis 134 of the shaft 60 such that the tine 140 is generally above the hoop 142 along the vertical axis 109 during oscillation of the agitator 56. In this way, during oscillatory motion of the agitator 56, the hoop 142 may be positioned proximate to the inlet 110 (e.g., longitudinally aligned with the inlet 110) and generally below the shaft 60 along the vertical axis 109, and the tine 140 may be positioned longitudinally offset to the inlet 110 and generally above the shaft 60 along the vertical axis 109. Thus, the hoop 142 may engage particulate material that is adjacent to (e.g., directly above) the inlet 110, and the tine 140 may engage with particulate material that is farther away from the inlet 110 (e.g., near the storage tank and/or between inlets).

As an example, the hoop 142 may oscillate along a length 144 of the inlet 110 (e.g., performing a "sweeping" or "swinging" motion over the inlet 110). Such movement of the hoop 142 may break up clumps directly above the inlet 110 and/or shape the particulate material into a more suitable shape (e.g., a smaller size) to enable the particulate material to flow through the inlet 110. As a result, the possibility of a blockage forming directly above the inlet is substantially reduced or eliminated. Furthermore, movement of the hoop 142 away from the inlet 110 (e.g., upwardly along the vertical axis 109) may cause a portion of the particulate material to lift, thereby transferring kinetic energy to surrounding particulate material (e.g., within the storage tank) and inducing movement of the surrounding particulate material. In addition, the tine 140 may extend above the shaft 60 (e.g., toward the storage tank) along the vertical axis 109 during oscillatory motion of the agitator 56. Movement of the tine 140 may break up clumps of particulate material entering the sub-hopper 100, thereby substantially reducing and/or eliminating the possibility of the particulate material bridging within the sub-hopper 100 and inducing the particulate material to flow through the sub-hopper 100 and toward the inlet 110. As such, movement of the tine 140 and the hoop 142 facilitates movement of particulate material throughout the sub-hopper 100 into the inlet 110.

Figure 5:
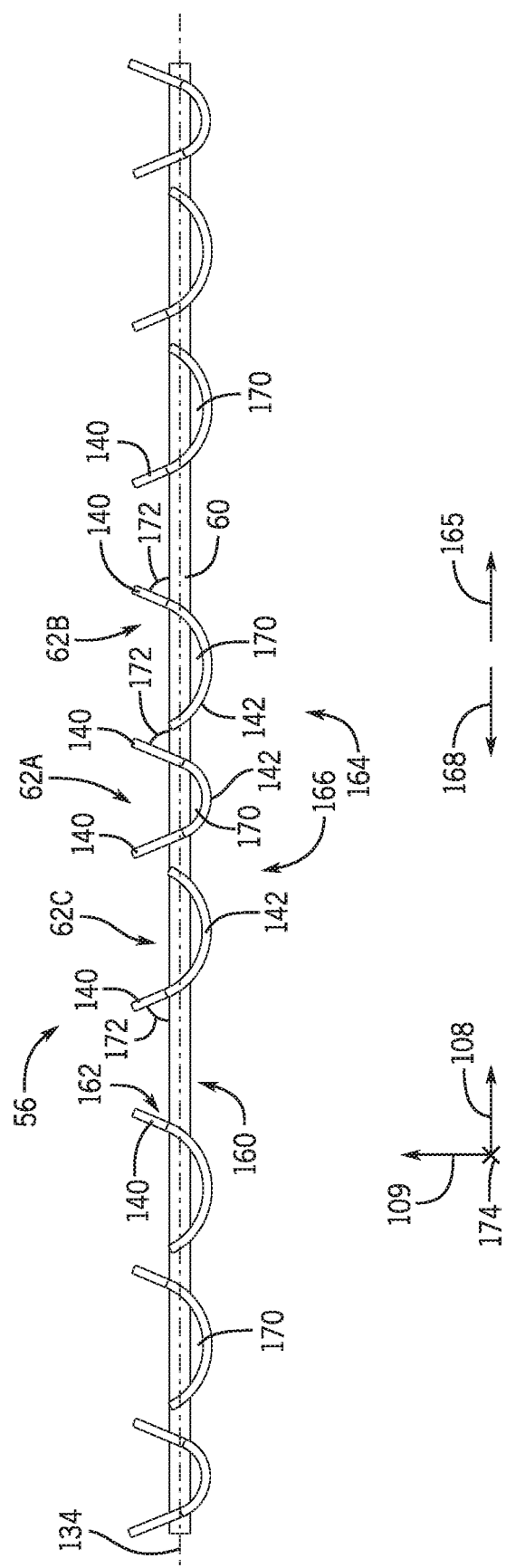
FIG. 5 is a front view of an embodiment of an agitator that may be employed within the agitating system of FIG. 3, in which the agitator has a shaft and multiple extensions, in accordance with an aspect of the present disclosure.

FIG. 5 is a front view of an embodiment of an agitator 56 that may be employed within the agitating system of FIG. 3, in which the agitator has a shaft 60 and multiple extensions 62. In certain embodiments, the shaft 60 and the extensions 62 are each formed from the same material, such as a metal, a polymer, a composite, or any combination thereof, having sufficient strength to maintain structural integrity (e.g., substantial rigidity) during operation of the agricultural implement. Additionally or alternatively, the shaft and the extensions are formed from different materials. In some embodiments, each extension 62 is separately formed from the shaft 60 and may be coupled to the shaft 60 via a welded connection, fastener(s), an interference fit, another suitable manner, or any combination thereof. In additional or alternative embodiments, each extension may be integrally formed with the shaft (e.g., via an injection molding process, via a casting process, via a machining process, etc.).

Each extension 62 has at least one hoop 142 and at least one tine 140. In some embodiments, each extension 62 may be positioned on the shaft 60 along the longitudinal axis 108 to substantially align each hoop 142 with an inlet of the particulate material metering system. Thus, each extension 62 may facilitate movement of particulate material into a corresponding inlet. In the illustrated embodiment, an entirety of each extension 62 is coupled to the same lateral side (e.g., a front side 160 along a lateral axis 174) of the shaft 60, but in additional or alternative embodiments, at least one of the extensions may be coupled to a different, suitable lateral side (e.g., a rear side 162 along the lateral axis 174) of the shaft. Furthermore, in certain embodiments, the same extension may be coupled to multiple lateral sides of the shaft (e.g., looping around a bottom portion of the shaft), and/or a portion of at least one extension may extend through the shaft. Moreover, the hoop 142 is integrally formed with the respective tine 140 of each extension 62 to reduce a duration and/or complexity associated with manufacturing the extension 62. However, in additional or alternative embodiments, at least one hoop may not be integrally formed with the respective tine. In such embodiments, the hoop and the tine may not be connected to one another and may be separately coupled onto the shaft.

In the illustrated embodiment, the extensions 62 are divided into three groups, each group has three extensions 62 that are generally proximate to one another along the longitudinal axis 108, and the groups are spaced apart from one another along the longitudinal axis 108 to align the hoops 142 with the inlets 110. However, in additional or alternative embodiments, the extensions may be positioned in any suitable locations along the longitudinal axis 108 (e.g., based on the longitudinal positions of the corresponding inlets). Further, each group of extensions 62 may include differently-shaped extensions 62. For example, the agitator 56 may include first extensions 62A having a U-shape or V-shape. Each first extension 62A may have two tines 140 connected with one hoop 142. The agitator 56 may also include second extensions 62B having a J-shape. For instance, each second extension 62B may include a single hoop 142 and a single tine 140 extending from the hoop 142 in a first longitudinal direction 165 away from the first extension 62A. Further, the agitator 56 may include third extensions 62C having an L-shape, which may mirror the second extensions 62B having the J-shape. By way of example, each third extension 62C may include a single hoop 142 and a single tine 140 extending from the hoop 142 in a second longitudinal direction 168, opposite the first longitudinal direction 165, away from the first extensions 62A.

Each second extension 62B may be positioned at a first side 164 of the first extension 62A along the longitudinal axis 108. Further, each third extension 62C may be positioned at a second side 166 of the first extension 62A opposite the first side 164 along the longitudinal axis 108. In this manner, the second extension 62B and the third extension 62C may symmetrically mirror about the first extension 62A.

Due to the arrangement and configuration of the extensions, each respective extension 62 does not interfere with another adjacent extension 62. For instance, adjacent tines 140 do not contact or cross over one another. Additional or alternative group(s) of extensions may have different combination(s) of extension types and/or orientation(s) of the extensions. For example, one group of extensions may have a U-shaped extension and two J-shaped extensions, two L-shaped extensions and a U-shaped extension, three J-shaped extensions and no L-shaped extensions, three L-shaped extensions and no J-shaped extensions, or any other suitable grouping of extension types. Indeed, a group of extensions may have fewer or more than three extensions as illustrated in FIG. 5. In further embodiments, at least two extensions may be connected to one another (e.g., to form a sine wave profile along the longitudinal axis 108).

Oscillation of the agitator 56 about the rotational axis 134 causes the hoops 142 to interact with the particular material to facilitate flow of the particulate material into respective inlets. By way of example, as each hoop 142 oscillates above a respective inlet, the hoop 142 may shape the particulate material within an opening 170 between the hoop 142 and the shaft 60 into a target profile that facilitates flow of the particular material through the inlet. For instance, the U-shape of the hoop 142 may form the particulate material into a semi-elliptical in the illustrated embodiment above the inlet, thereby facilitating flow of the particulate material through the inlet. In additional or alternative embodiments, the hoop may form the particulate material into triangular, semi-circular, and/or another suitable shape to facilitate the flow of particulate material through the inlet. Moreover, each tine 140 may extend away from the shaft 60 at an angle 172 relative to the rotational axis 134 of the shaft 60. The angle 172 may be substantially less than 90 degrees, such that the tine 140 extends acutely or obliquely relative to the shaft 60. In this manner, during oscillation of the agitator 56, the tine 140 may engage particulate material located outwardly from the hoop 142 along the longitudinal axis 108 to promote movement of the particulate material. Additionally or alternatively, the tine may at least partially extend along a lateral axis 174 and engage particulate material located outwardly from the hoop 142 along the lateral axis 174. The movement of each tine 140 may also direct the particulate material toward one of the hoops 142 (e.g., the respective hoop and/or an adjacent hoop), and, the hoop 142, in turn, may direct the particular material toward the respective inlet 110. In other words, particulate material engaged by the tine 140 may flow generally along the tine 140 to a hoop 142. The hoop 142 may then shape the particulate material into the target shape to facilitate flow of the particulate material into the respective inlet. Thus, the combination of the tine 140 and the hoop 142 may control movement of the particulate material into the inlets, further facilitating particulate material through the sub-hopper to the metering system.

In certain embodiments, a shape of each tine 140 and a shape of each hoop 142 may be particularly selected based on factors associated with operation of the agricultural implement. For example, the angle 172 of the tine 140 relative to the rotational axis 134 of the shaft 60, a length of the tine 140, of the tine 140, another suitable tine parameter, or a combination thereof, and/or a radius of the hoop 142, an arc length of the hoop 142, a curvature of the hoop 142, another suitable hoop parameter, or a combination thereof, may be selected based on the type of particulate material within the storage tank, a target amount of particulate material in the storage tank, a size of each inlet, a position of the agitator 56 relative to the inlets, a torque provided by the motor of the agitator drive system, another suitable factor, or any combination thereof. Indeed, the configuration of the extensions may vary based on the particular position of each extension. In an example, an arc length of the hoop 142 of the first extension 62A is smaller than the arc length of the hoops 142 of the second extension 62B and the third extension 62. Further, although the tines and hoops have circular cross-sections in the illustrated embodiment, in additional or alternative embodiments, at least one tine and/or at least one hoop may have any another suitably shaped cross-section, such as rectangular, triangular, square, hexagonal, and so forth.

FIG. 6 is an expanded perspective view of a portion of an embodiment of an agitator 196 that may be employed within the agitating system of FIG. 3, in which the agitator 196 has a shaft 60 and multiple extensions 198. In the illustrated embodiment, each tine 140 is coupled to a segment 200 of the extension 198. For example, the tine 140 and the hoop 142 may be positioned on the front side 160 of the shaft 60, and the segment 200 may be positioned on the rear side 162 of the shaft 60. Each segment 200 may have an L-shape or J-shape and may extend parallel to the respective tine 140. In addition, each segment 200 may be coupled to the respective tine 140, thereby enhancing the structural rigidity of the extension 198. In addition, the segment 200 may increase a range of coverage provided by the extensions 198 along the lateral axis 174 to engage a greater amount of particulate material along the lateral axis 174. In additional or alternative embodiments, at least one extension may include an additional segment parallel with the hoop 142. Such extension embodiments may therefore include hoops and tines on both the front side and the rear side of the shaft and aligned with one another along the longitudinal axis.

FIG. 7 is an expanded perspective view of an embodiment of an agitator 220 that may be employed within the agitating system of FIG. 3, in which the agitator 220 has a shaft 60 and multiple extensions 222. The extensions 62 in the illustrated embodiment have a generally flat rectangular cross-section, and the shaft 60 extends through each extension 222. Thus, the extensions 222 extend from the front side 160 to the rear side 162 of the shaft 60. In additional or alternative embodiments, at least one extension may have a differently-shaped cross-section, such as an elliptical cross-section. The illustrated extensions 222 may be more rigid than the extensions disclosed above with reference to FIG. 5, and/or the illustrated extensions 222 may increase the rigidity of the shaft 60. Accordingly, the agitator 220 having the illustrated extensions 222 may be utilized for agitating denser particular material. The illustrated extensions 62 may be integrally formed (e.g., molded, metal-casted) with the shaft 60. Furthermore, during oscillation of the agitator 220 about the rotational axis 134, the extensions 62 of the illustrated embodiment may engage more particulate material along the lateral axis 174 than the extensions disclosed above with reference to FIG. 5. Thus, the extensions 62 may promote flow of the particulate material into the inlets.

It should be noted that the variations disclosed above with regard to the extension embodiment of FIG. 5 may also be employed within the disclosed embodiments of FIGS. 6 and 7. For instance, the embodiments of FIGS. 6 and 7 may have the geometric variations of the extensions, the coupling between the extensions and the shaft, and so forth, described above. Furthermore, the same agitator may have various embodiments of the extensions. Indeed, various extension embodiments may be positioned along the shaft such that different groups of extension embodiments have a different extension embodiment and/or a single group of extensions has various extension embodiments.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agitator for an agricultural system, comprising:
a shaft configured to rotate about a rotational axis during operation of the agricultural system; and
an extension coupled to the shaft, wherein the extension includes a hoop and a tine extending from the hoop, the tine extends acutely relative to the rotational axis of the shaft, the hoop is configured to overlap an inlet of a metering system of the agricultural system relative to the rotational axis, and the tine is configured to be offset from the inlet of the metering system relative to the rotational axis.

2. The agitator of claim 1, comprising a sub-hopper and the metering system, wherein the metering system is configured to couple to the sub-hopper, and the inlet is configured to receive particulate material.

3. The agitator of claim 2, wherein the shaft, the extension, or both, are disposed within the sub-hopper.

4. The agitator of claim 1, wherein the hoop is aligned with the inlet relative to the rotational axis.

5. The agitator of claim 1, comprising a driver configured to cyclically rotate the shaft in a first rotational direction about the rotational axis and in a second rotational direction, opposite the first rotational direction, about the rotational axis.

6. The agitator of claim 1, wherein the hoop and the tine of the extension have a circular cross-section or a rectangular cross-section.

7. The agitator of claim 1, wherein an entirety of the extension is positioned on a lateral side of the shaft, or the shaft extends through the extension.

8. The agitator of claim 1, wherein the tine extends along the shaft and forms an acute angle with the shaft.

9. An agitating system for an agricultural system, comprising:
a sub-hopper configured to couple to a metering system having a plurality of inlets;
a shaft disposed within the sub-hopper and configured to rotate about a rotational axis during operation of the agricultural system; and
a plurality of extensions coupled to the shaft, wherein each extension of the plurality of extensions includes a hoop and a tine integrally formed with the hoop, each extension of the plurality of extensions is positioned along the shaft such that each hoop overlaps an inlet of the plurality of inlets relative to the rotational axis, and each tine extends acutely relative to the rotational axis and is offset from the inlet relative to the rotational axis.

10. The agitating system of claim 9, wherein a respective hoop and a respective tine of each extension of the plurality of extensions form a U-shape, a J-shape, an L-shape, or any combination thereof.

11. The agitating system of claim 9, wherein a first extension of the plurality of extensions comprises the tine and an additional tine that extend from the hoop.

12. The agitating system of claim 11, wherein a second extension of the plurality of extensions is positioned adjacent to the first extension of the plurality of extensions, and the tine of the second extension extends away from the first extension.

13. The agitating system of claim 12, wherein the second extension is positioned on a first side of the first extension relative to the rotational axis, the tine of the second extension extends away from the first extension in a first direction relative to the rotational axis, a third extension of the plurality of extensions is positioned adjacent to the first extension on a second side of the first extension, opposite the first side, relative to the rotational axis, and the tine of the third extension extends away from the first extension in a second direction, opposite the first direction, relative to the rotational axis.

14. The agitating system of claim 13, wherein a first arc length of the hoop of the first extension is smaller than a second arc length of the hoop of the second extension and a third arc length of the hoop of the third extension.

15. The agitating system of claim 9, wherein each extension of the plurality of extensions is coupled to the shaft via a welded connection, a fastener, an interference fit, or any combination thereof.

16. The agitating system of claim 9, wherein each extension of the plurality of extensions is integrally formed with the shaft.

17. An agitator for an agricultural system, comprising:
a shaft configured to rotate about a rotational axis during operation of the agricultural system;
an extension coupled to the shaft, wherein the extension includes a hoop and a tine extending from the hoop, and the tine extends acutely relative to the rotational axis of the shaft;
a sub-hopper;
a metering system configured to couple to the sub-hopper, wherein the metering system includes an inlet configured to receive particulate material; and
a driver configured to cyclically rotate the shaft in a first rotational direction about the rotational axis and in a second rotational direction, opposite the first rotational direction, about the rotational axis, wherein the hoop overlaps the inlet of the metering system relative to the rotational axis, and the tine is offset from the inlet relative to the rotational axis.

* * * * *